United States Patent [19]

Van de Voorde et al.

[11] Patent Number: 5,384,651
[45] Date of Patent: Jan. 24, 1995

[54] OPTICAL TRANSMISSION SYSTEM

[75] Inventors: Ingrid Z. B. Van de Voorde, Dilbeek; Denis J. G. Mestdagh, Brussels; Gert Van der Plas, Merchtem; Christiaan H. J. Sierens, Kontich; Willem J. A. Verbiest, Sint Gillis Waas, all of Belgium

[73] Assignee: Alcatel N.V., Amsterdam, Netherlands

[21] Appl. No.: 216,245

[22] Filed: Mar. 21, 1994

Related U.S. Application Data

[63] Continuation of Ser. No. 992,606, Dec. 18, 1992.

[30] Foreign Application Priority Data

Dec. 23, 1991 [EP] European Pat. Off. ............ 91203369

[51] Int. Cl.⁶ .............................................. H04B 10/00
[52] U.S. Cl. ..................................... 359/152; 359/156; 359/173; 359/124
[58] Field of Search ............... 359/113, 152, 153, 154, 359/156, 168, 173, 115, 124; 370/69.1

[56] References Cited

U.S. PATENT DOCUMENTS

| | | | |
|---|---|---|---|
| 5,020,153 | 5/1991 | Choa et al. | 359/152 |
| 5,214,641 | 5/1993 | Chen et al. | 370/69.1 |

FOREIGN PATENT DOCUMENTS

| | | | |
|---|---|---|---|
| 3417644 | 4/1986 | Germany | H04B 9/00 |
| 2196809 | 5/1988 | United Kingdom | H04B 9/00 |

OTHER PUBLICATIONS

8 Gbit/s FSK Modulation of DFB Lasers with Optical Demodulation by A. R. Chraplyvy et al, Electronics Letters, 2nd Mar. 1989, vol. 25, No. 5, pp. 319–321.

Fiber Loop Reflectors by David B. Mortimore, Journal of Lightwave Technology, vol. 6, No. 7, Jul. 1988, pp. 1217–1224.

Heterodyne Transmission of a 560 Mbit/s Optical Signal by Means of Polarisation Shift Keying by E. Dietrich, Electronics Letters, 9th Apr. 1987, vol. 23, No. 8, pp. 421–422.

*Primary Examiner*—Richard E. Chilcot, Jr.
*Assistant Examiner*—Rafael Bacares
*Attorney, Agent, or Firm*—Ware, Fressola, Van Der Sluys & Adolphson

[57] ABSTRACT

The system includes two transmitters (T1, T2) and two receivers (R1, R2). One transmitter (T1) may include a wavelength tunable laser, sending an FSK optical signal (OS1) which has a constant intensity. In a first receiver (R1) this FSK optical signal (OS1) is transformed into an IM signal (OS1') by an optical pass band filter. This IM signal (OS1') is then detected by a first direct detection receiver (DM). In a second direct detection receiver (R2) the FSK optical signal (OS1) is not detected, since it has constant intensity. A second transmitter (T2) includes a Fabry Perot laser or a LED with a broad linewidth, sending an IM optical signal (OS2). This IM optical signal (OS2) is detected by the second direct detection receiver (R2). It is not detected by the first direct detection receiver (DM), because it is strongly attenuated when passing through the narrow bandpass optical filter (TM) before being applied to the first direct detection receiver. This system is especially advantageous in bidirectional optical transmission systems, due to its inherent insensitivity to reflections.

9 Claims, 2 Drawing Sheets

OPTICAL TRANSMISSION SYSTEM

This is a continuation of copending application Ser. No. 07/992,606 filed on Dec. 18, 1992.

TECHNICAL FIELD

The present invention relates to optical transmission systems and, more particularly, to transmission of more than one signal on a common optical transmission link.

BACKGROUND OF THE INVENTION

Known optical transmission systems include a first transmitter transmitting a first optical digital signal and a second transmitter transmitting a second optical digital signal to a first and a second receiver respectively via a common optical transmission link, the second signal being intensity modulated and the second receiver being able to detect intensity modulated signals only.

Such a system, known in the art, is e.g. described in "Siemens Telecom report, 6 Jahrgang, April 1983, Beiheft, p. 122-123". Therein a unidirectional transmission system is shown in FIG. 2b, p. 122, whereas a bidirectional one is represented in FIG. 3b, p. 123. In both systems the transmitters transmit optical intensity modulated signals with distinct wavelengths. These signals are received by so-called direct detection receivers which are sensitive to light intensity variations only. Based on the wavelength of the optical signal each receiver selects the optical signal destined to it by means of a wavelength division demultiplexer.

By using different wavelengths the transmitters can simultaneously send optical signals over the same optical fiber link, but this either requires a relatively wide bandwidth when the used wavelengths are located relatively far from each other, i.e. when plain wavelength multiplexing is used, or expensive transceivers when dense Wavelength Division Multiplexing (WDH) is applied i.e. when the wavelengths are close to each other, which implies the need of a laser with narrow linewidth and very accurate tracking of the emitted optical wavelength.

It is to be noted that in the case of plain wavelength multiplexing the used wavelengths do not have to be very accurate, i.e. a relatively wide spectrum can be used. In what follows such a spectrum is called a wavelength window.

DISCLOSURE OF INVENTION

An object of the present invention is to provide a transmission system of the above known type, but wherein two signals can be transmitted in one wavelength window and which can be realized in a less expensive way compared to dense wavelength division techniques.

According to the invention this object is achieved due to the fact that a first optical signal has a constant intensity and a modulated signal characteristic other than its intensity and that a first receiver includes a bandpass filtering circuit which is able to attenuate the intensity of the first signal for one value of the modulated characteristic together with a second signal.

Since the first signal has a constant intensity it can not be detected by the second receiver and consequently no selection has to occur at the latter receiver. In this way the new system is less expensive than the known one since a selection means is saved in the second receiver. Moreover compared to the known system a less expensive laser or LED can be used in the second transmitter.

At the first receiver the filtering circuit attenuates the intensity of the first signal for one value of the modulated characteristic, thereby generating an intensity modulated signal which can be detected by the detector, and as mentioned earlier it additionally attenuates the second signal. Hence, the only requirement on the second signal is that it has low power in the spectral band defined by the passband of the filtering circuit. As a result, and taking as signal characteristic its wavelength, the wavelength of the second signal and the wavelength for which the intensity of the first signal is attenuated may have the same value or the latter wavelength may be part of the wavelength window of the second signal.

In this way a system is realized which makes it possible to transmit two optical signals within the same wavelength window, over one optical link.

The system is in fact based on the insight that it is possible to distinguish different signals, e.g. optical signals, on the basis of how these signals are modulated. The second transmitter indeed modulates the intensity of the second signal, whilst the first transmitter modulates the first signal in such a way that its intensity is constant i.e. by modulating one of its other signal characteristics such as the wavelength or the polarisation. In this way there is no need for different wavelengths to distinguish the signals.

To be noted that such a system can be unidirectional as well as bidirectional.

Transmission systems simultaneously sending signals with the same wavelength over a common fiber are already known in the art e.g. from the article "Design considerations for optical duplex transmissions" by A. Yoshida, from Electronic Letters Vol. 25, No 25, pp. 1723-1725. Systems, as described in the above article, have to solve the problem of signal reflections which mainly occur in bidirectional realizations. These reflections can be made negligible with respect to a received main signal by increasing the power of the transmitted main signal. This however implies the use of expensive lasers.

Moreover for a bidirectional system with high reflectivities and a high power budget, increasing the power of the transmitter at both sides can not cancel the penalty introduced by the reflections. This is due to the fact that when the power at e.g. a side 1 of a transmission system is increased to overcome the reflections at a side 2, the reflections at side 1 will increase, which implies that side 2 has to send higher power, resulting again in higher reflections at side 2 and so on. Hence it can be understood that in some cases bidirectional transmission as described above is not possible.

In bidirectional systems according to the invention on the contrary, signal reflections are negligible since the new transmission system is realized in such a way that the first receiver receives the first signal with a considerably attenuated second signal, and the second receiver can only receive the second signal.

An additional important advantage of the invention is that it can be applied to an existing transmission infrastructure, i.e. only the transmitters and receivers of the existing system have to be adapted, since apart from the transmitters and receivers the technique used in the invention does not impose constraints on the characteristics of the components used in the transmission system.

An embodiment of the invention is first transmitter includes a wavelength tunable laser, that the second transmitter includes either one of a standard laser and a light emitting diode, that the detector is a first direct detection receiver and that the second receiver is a second direct detection receiver.

The advantage resulting from this embodiment is that it represents a simple implementation using mostly cheap components. Only the wavelength tunable laser and the needed filtering circuit are somewhat more expensive. However, in bidirectional applications with a main station comprising one main transmitter and receiver, and a plurality of subscriber stations, each comprising one subscriber transmitter and receiver of the same type as the second transmitter and receiver, respectively, the main transmitter can comprise the wavelength tunable laser, whilst the subscriber transmitters can use standard Fabry-Perot lasers, Light Emitting Diodes (LED), and so on in which case the expense of the wavelength tunable laser is spread amongst the various subscribers. The filtering circuit can be integrated in the direct detection receiver at the main station and in this way it does not considerably contribute to the expense of this receiver. To be noted that in such a system the signals sent by the various subscribers have to be distinguished by for instance using time multiplexing when the same wavelength is used, or by using different wavelength windows laying outside the passband of the filter or for which the signal has low power when laying within that passband.

It should be stressed here that both the second transmitter and receiver, and the first transmitter and receiver, more specifically the standard laser and the direct detection receiver, and the wavelength tunable laser and the filtering circuit with the direct detection receiver respectively, are separately known in the art. The first transmitter and receiver, are e.g. described in "Electronics letters, Vol. 25, No 5, 2nd March 1989, p. 319-321". The invention however lies in their combination.

The above mentioned and other objects and features of the invention will become more apparent and the invention itself will be best understood by referring to the following description of an embodiment taken in conjunction with the accompanying drawing which represents an optical transmission system according to the invention together with signals appearing therein.

BEST MODE FOR CARRYING OUT THE INVENTION

Figure 1:
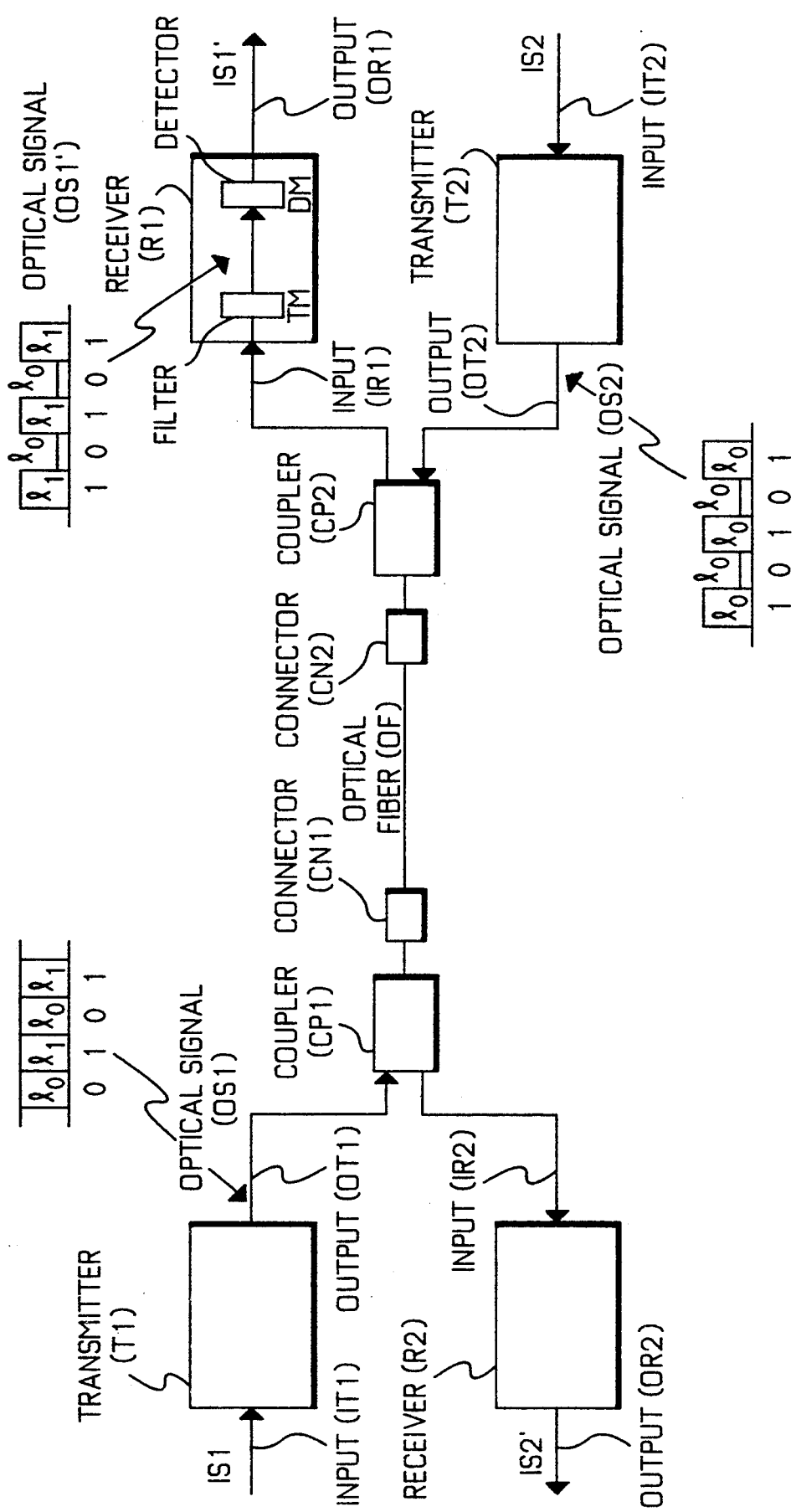
FIG. 1 shows a transmission system, according to the invention, with bidirectional transmission.
Figure 2:
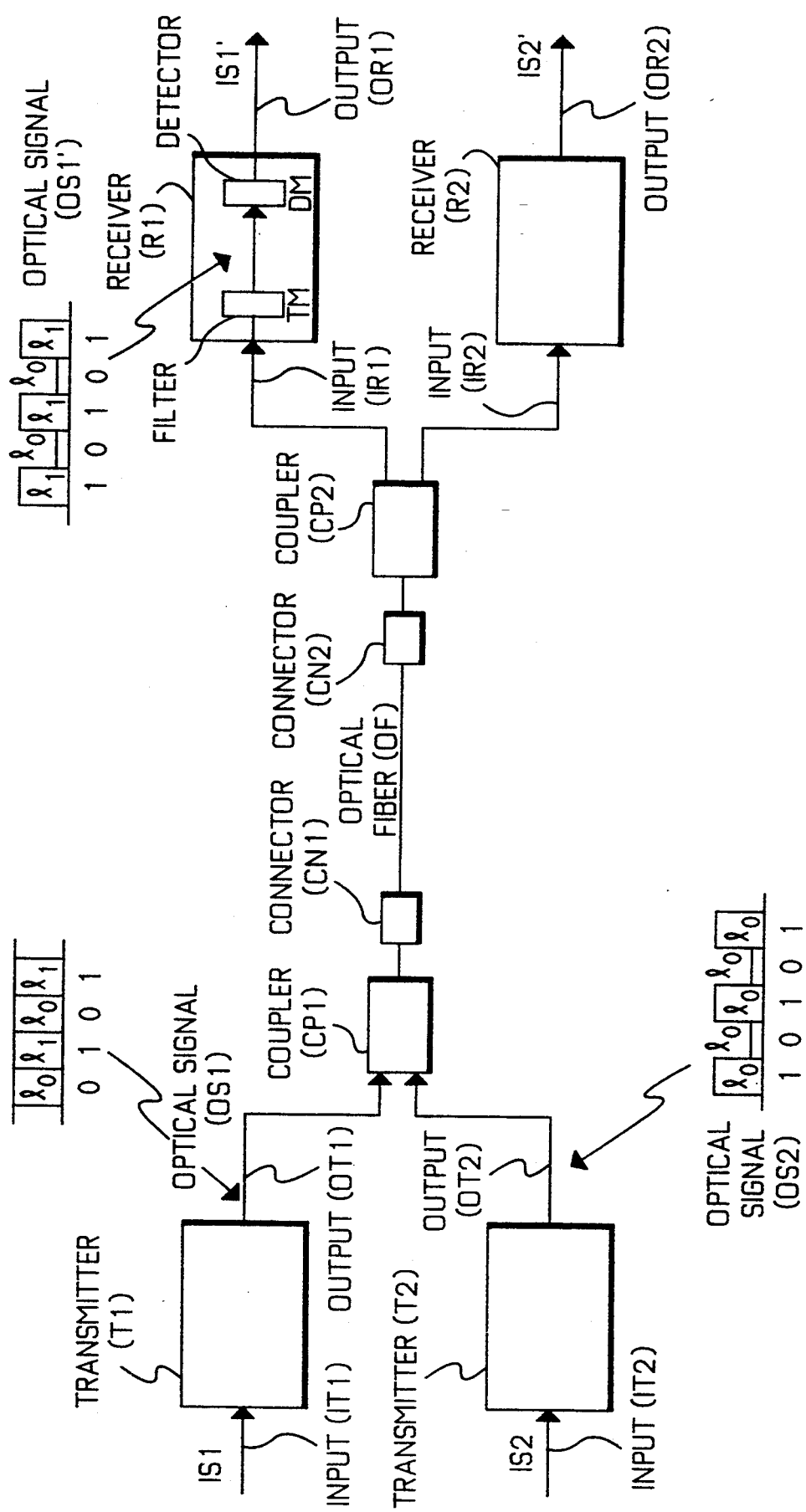
FIG. 2 shows a transmission system, according to the present invention, with unidirectional transmission.

The transmission system, shown in FIG. 1 is a bidirectional one although it should be understood that the invention is usable for unidirectional embodiments as well as shown, for example, in FIG. 2. It includes transmitters T1 and T2 with inputs IT1 and IT2 and outputs OT1 and OT2 respectively, and receivers R1 and R2, with inputs IR1 and IR2 and outputs OR1 and OR2 respectively. The output OT1 is via a cascade connection of a 3dB-coupler CP1, a connector CN1, a common optical fiber OF, a connector CN2 and a 3dB coupler CP2 coupled to the input IR1 of the receiver R1, whilst OT2 is coupled to IR2 via CP2, CN2, OF, CN1 and CP1.

To build a unidirectional transmission system, such as shown in FIG. 2, it is sufficient to interchange the transmitter T2 and the receiver R2. The system of the Figures will of course be evident to those skilled in the art that the precise coupling components disclosed need not be included in any given optical fiber link but other structures and connections can be used as well to establish an optical link.

In both FIGS. 1 and 2, transmitter T1 may include a (not shown) wavelength tunable laser operating in frequency shift keying mode (FSK-mode) and producing an optical output signal OS1 with constant intensity but having a wavelength $l_0$ or $l_1$ depending on the binary value of a digital signal IS1 applied at its input IT1.

In both FIGS. 1 and 2, transmitter T2 includes an also not shown standard laser, e.g. a Fabry-Perot laser, producing an optical output signal OS2 with a wavelength $l_0$ and the intensity of which is modulated, by ON-OFF keying, by a digital signal IS2 applied to its input IT2. In case the standard laser is a LED, OS2 has a relatively wide spectrum.

It should be noted that T2 may be any type of laser or a Light Emitting Diode, as long as it emits low power in a spectral band corresponding to the passband of the filter.

In both FIGS. 1 and 2 receiver R1 includes the cascade connection of a filtering circuit TM and a detector DM. An input of TM is connected to the input IR1, whilst an output of DM corresponds to the output OR1. The filtering circuit TM is an optical bandpass filter, more specifically a so called Fabry-Perot interferometric filter (FPI-filter) which strongly attenuates the intensity of signals with a wavelength laying outside a wavelength band which includes $l_1$ and excludes $l_0$. The detector DM is a direct detection receiver which only detects signals varying in intensity.

In both FIGS. 1 and 2 receiver R2 is also a direct detection receiver, being able to detect intensity modulated signals only.

In both FIGS. 1 and 2 the optical signal OS1 produced by the transmitter T1 is transmitted via CP1, OF and CP2 to the inputs IR1 of R1, whilst OS2 is transmitted to R2 in the inverse direction in FIG. 1 and in the same direction in FIG. 2.

The filtering circuit TM of R1 converts the signal OS1 to an optical signal OS1' which is intensity modulated by the digital signal IS1 since the filtering circuit TM passes signals with wavelength $l_1$ but strongly attenuates the intensity of signals with wavelength $l_0$. The signal OS1' is then detected by the direct detection receiver DM, thereby providing the digital signal IS1' at the output OR1. Because the signal OS1 has a constant intensity it is not detected by the direct detection receiver R2, of FIG. 1 or 2 and it consequently does not cause signal reflections and does not degrade the detection of OS2.

In both FIGS. 1 and 2 the filtering circuit TM of R1 strongly attenuates the signal OS2 as it has a wavelength $l_0$. Hence, OS2 is not detected by the direct detection receiver DM, which means with respect to FIG. 1, that also on the side of T2, signal reflections, of OS2 cause no degradations of OS1'.

It should be noted that if the signal OS2 is generated by another laser or LED emitting low power in a spectral band corresponding to the passband of the filter, the latter signal is in the same way attenuated and causes no reflections.

In both FIGS. 1 and 2, signal OS2 however is intensity modulated by the digital signal IS2 and is consequently detected by the direct detection receiver R2, thereby providing the digital signal IS2' at the output OR2.

To be noted that the wavelength tunable laser in T1 could also be operated in polarisation shift keying mode, in which case the filtering circuit has to be polarisation sensitive. Since such an embodiment is similar to the above described embodiment, it is not described in details.

All optical elements used in the above system are well known in the art, e.g. from the books "Semiconductor Lasers for Long-Wavelength optical-fiber Communication Systems" by M. J. Adams et al, edited by Peter Peregrinus Ltd., and "Single Frequency Semiconductor Lasers" by Jens Buus, Volume TT5 edited by Donald C. O'Shea and from the article "Characteristics and applications of high performance, tunable, fiber Fabry-Perot filters" by Calvin M. Miller and presented at the 41st ETC Electronics Components and Technology Conference Atlanta, Hay 13–15, 1991. These elements are therefor not described in detail.

It has to be stressed that the above described system is not restricted to a second transmitter sending a signal OS2 with a wavelength equal to the suppressed wavelength value of OS1, i.e. $l_0$ or to a wavelength window including $l_0$. OS2 may have a wavelength $l_2$ or a wavelength window excluding $l_0$, as long as OS2 is strongly attenuated by the bandpass filter TM.

As a consequence the system can be extended to more transmitters and receivers of the same type as T2 and R2 respectively with the transmitters sending out signals having a different wavelength window, provided that these signals are attenuated by R1, i.e. that their wavelength window lays outside the passband of the filter or that they emit low power in their wavelength window when the latter overlaps the passband of the filter. In such an extended system the transmitters may also send out signals having a same wavelength window, but then these signals have to be distinguished in another way, e.g. by time multiplexing.

While the principles of the invention have been described above in connection with specific apparatus, it is to be clearly understood that this description is made only by way of example and not as a limitation on the scope of the invention.

We claim:

1. Transmission system including a first transmitter (T1) transmitting a first optical digital signal (OS1) and a second transmitter (T2) simultaneously transmitting a second optical digital signal (OS2) to a first (R1) and a second (R2) receiver respectively via a common optical transmission link (OF), said second signal (OS2) being intensity modulated and said second receiver (R2) being able to detect intensity modulated signals only, wherein said first optical signal (OS1) has a constant intensity and a modulated signal characteristic other than its intensity and wherein said first receiver (R1) includes a bandpass filtering circuit which is able to attenuate the intensity of said first signal for one value of said modulated characteristic together with said second signal.

2. Transmission system according to claim 1, wherein said first optical signal (OS1) is an optical wave frequency shift keyed signal and that said bandpass filtering circuit is an optical wavelength selective filter.

3. Transmission system according to claim 1, wherein said first optical signal (OS1) is a wave polarisation shift keyed signal and that said band pass filtering circuit is an optical polarisation sensitive filter.

4. Transmission system according to claim 2, wherein said optical wavelength selective filter is a Fabry-Perot interferometric filter.

5. Transmission system according to claim 1, wherein said first transmitter (T1) includes a wavelength tunable laser, that said second transmitter (T2) includes either one of a standard laser and a light emitting diode emitting a signal with low power in the spectral band defined by the pass band of the filter, that said detector (DM) is a first direct detection receiver and that said second receiver (R2) is a second direct detection receiver.

6. Transmission system according to claim 1, characterized in that said second transmitter emits low power in a spectral band corresponding with the passband of the filtering circuit.

7. The transmission system of claim 1, wherein the bandpass filtering circuit is able to transmit the intensity of another value of said modulated characteristic.

8. The transmission system of claim 7, wherein said second signal has a carrier characteristic the same as said modulated characteristic of said one value of said first signal.

9. The transmission system of claim 1, wherein said second signal has a carrier characteristic the same as said modulated characteristic of said one value of said first signal.

* * * * *